Aug. 1, 1944. K. W. COUSE 2,354,740
COMBINATION SCOOP-AND-BOOM STRUCTURE
Filed April 17, 1943 6 Sheets-Sheet 2

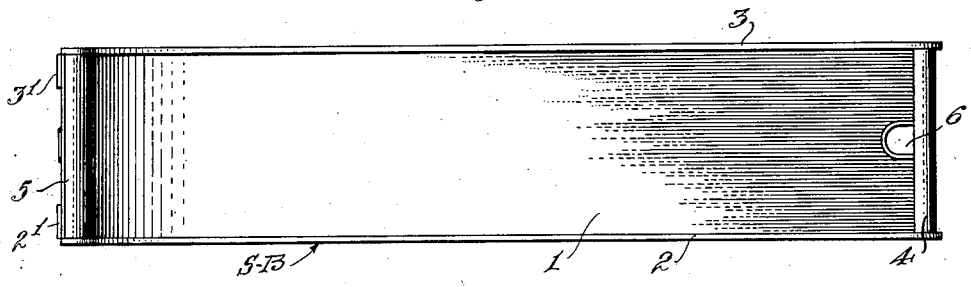
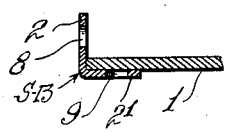
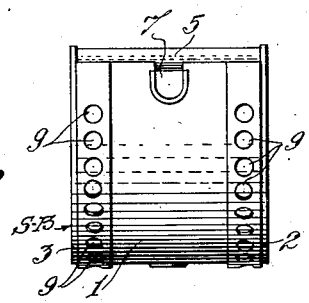
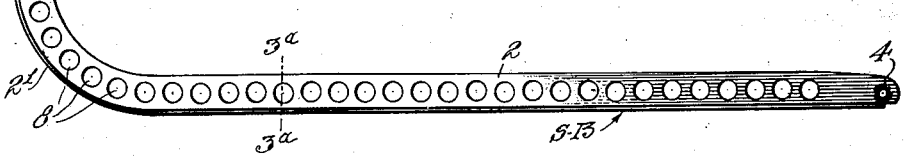
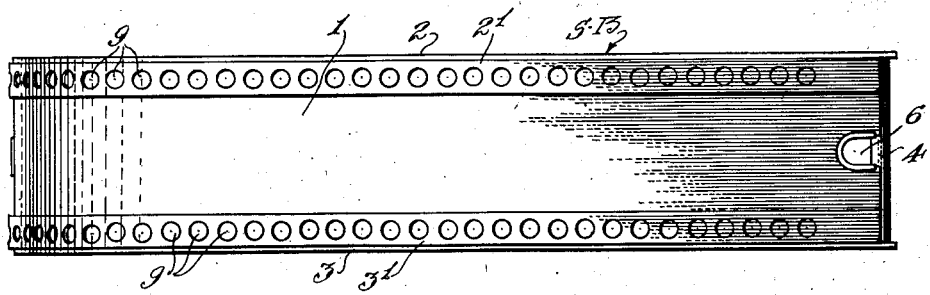

INVENTOR
Kibbey W. Couse
BY A. D. T. Libby
ATTORNEY

Aug. 1, 1944.                K. W. COUSE                2,354,740
            COMBINATION SCOOP-AND-BOOM STRUCTURE
               Filed April 17, 1943     6 Sheets—Sheet 5

INVENTOR
Kibbey W. Couse
BY
A. D. T. Libby
ATTORNEY

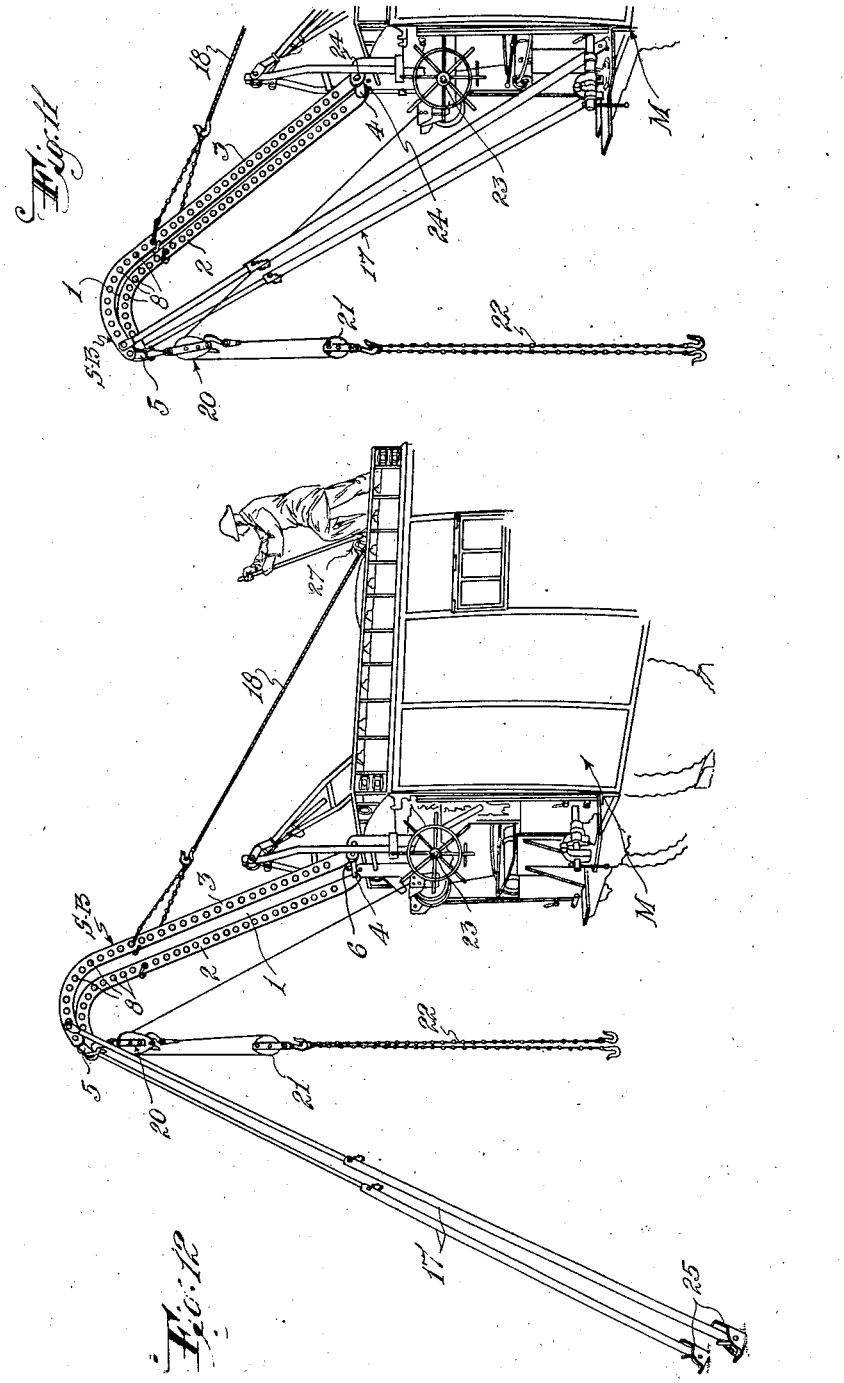

Patented Aug. 1, 1944

2,354,740

UNITED STATES PATENT OFFICE 2,354,740

COMBINATION SCOOP-AND-BOOM STRUCTURE

Kibbey W. Couse, Newark, N. J.

Application April 17, 1943, Serial No. 483,503

7 Claims. (Cl. 254—139.1)

In the operation of trucks and other heavy vehicles, especially in army service, many difficulties are encountered in traversing the terrain, and it quite frequently happens that such vehicles get stuck in the mud or get into some hole that makes it extremely difficult or impossible for the truck itself to get out.

It is therefore one of the objects of my invention to provide not only a structure which can be used in getting vehicles out of such places, but a structure which may be utilized for other purposes in association with specially equipped trucks.

The structure herein shown and described is especially useful in connection with a traveling machine shop similar to that shown in my Design Patent No. D-109,942, issued May 31, 1938, and when so used it may be used as a scoop or as a boom, thereby serving a very useful and dual function.

Certain of the useful applications are illustrated in the annexed drawings, wherein:

Figure 1 is a top plan view of the structure.

Figure 2 is an end view looking from left to right.

Figure 3 is a side elevation of Figure 1.

Figure 3a is a partial section on the line 3a—3a of Figure 3.

Figure 4 is a bottom view of Figure 3.

Figures 5 to 10 inclusive show the structure of Figures 1 to 4 inclusive when used generally as a scoop.

Figure 13:
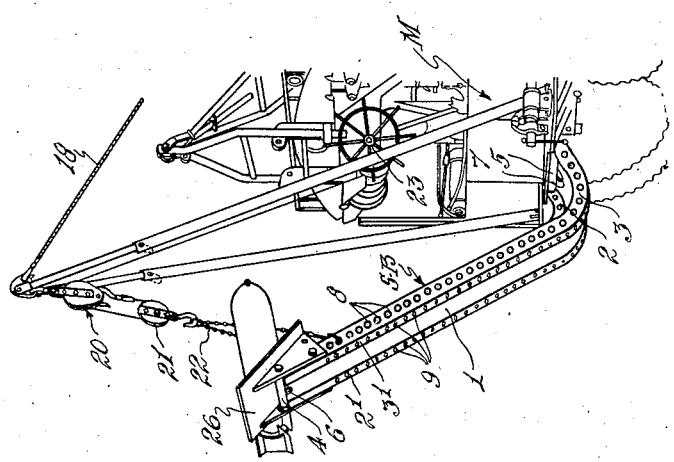

Figures 11, 12 and 13 show the structure of Figures 1 to 4 inclusive as a boom.

Figure 11 shows the structure when rigged on the end of a traveling machine shop rigged up for a maximum weight lift and reach with mobility.

Figure 12 shows the structure on a traveling machine shop when rigged up for maximum weight lift.

Figure 13 shows the structure used as a boom for picking up and moving articles, such as big shells or torpedoes.

In the various views, wherein like numbers refer to corresponding parts, 1 is the base plate of the scoop-boom structure hereinafter referred to as the "S-B" structure. The plate is made out of strong material such as steel and is approximately one-half inch thick. The plate may be of any desired width from two to four feet, and about eight to ten feet in length. Welded to the base plate 1, are two pieces or side members 2 and 3, each of which is of the same thickness and approximately the thickness of the main plate; namely, one-half inch. Along the bottom of the plate and closely adjacent the side members 2 and 3, are pieces or strips $2^1$ and $3^1$. These may be somewhat thinner, for example one-fourth inch, than the side members; or the parts 2, $2^1$ and 3, $3^1$, may be in the form of angle irons welded to the main plate. As will be seen from Figures 2 and 3, one end of the plate 1, together with the side members 2 and 3, and the bottom portions $2^1$ and $3^1$ are arcuately formed upwardly like the nose of a toboggan, but preferably less than ninety degrees from the plane of the base.

At both ends of the structure there are provided strong pipes 4 and 5 which are welded to the sides 2 and 3 immediately adjacent the base plate 1 which is cut away at both ends, forming holes or apertures 6 and 7 on the median line of the plate for a purpose which will be hereinafter described. The members 4 and 5 are preferably made out of pipes so that rods may be passed therethrough, the rods being of greater length than the width of the structure so that they may be used for reenforcing the pipes when strain is applied thereto or for supporting or fastening the structure to the truck during transportation.

The side members 2 and 3 are provided with a plurality of longitudinally arranged holes 8, and in some cases the bottom pieces 2¹ and 3¹, on which the base plate 1 rests, may have holes 9 for increasing the gripping power of the S-B structure under certain conditions of operation. For some purposes, the strips 2¹ and 3¹ may not be required.

Figure 5:
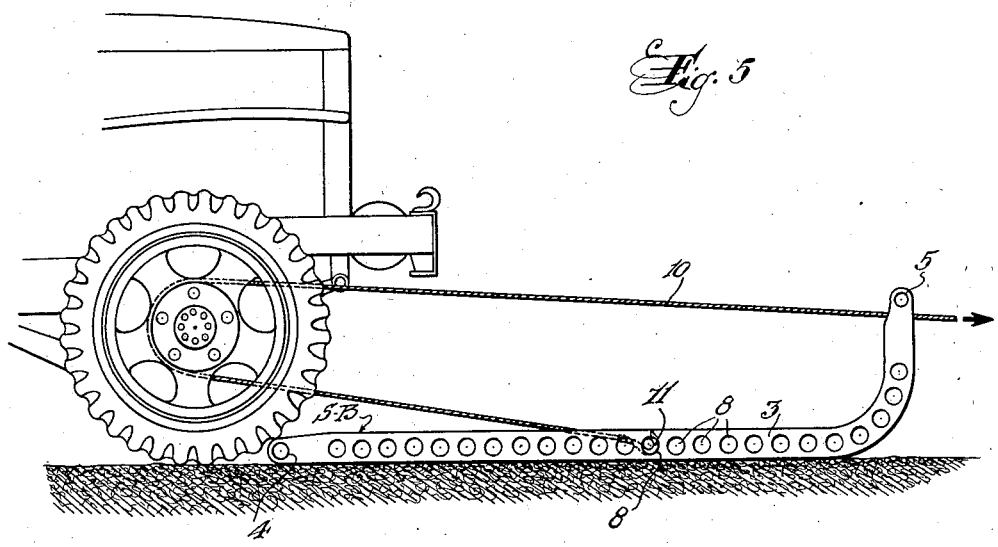
Figure 5 shows the structure about to be applied to a truck having dual wheels on each side, with a power cable passing between the dual wheels and around the union between the wheels in order to produce a barrel-roll effect. In other words, the wheel becomes the barrel to be rolled onto the structure.
Figure 6:
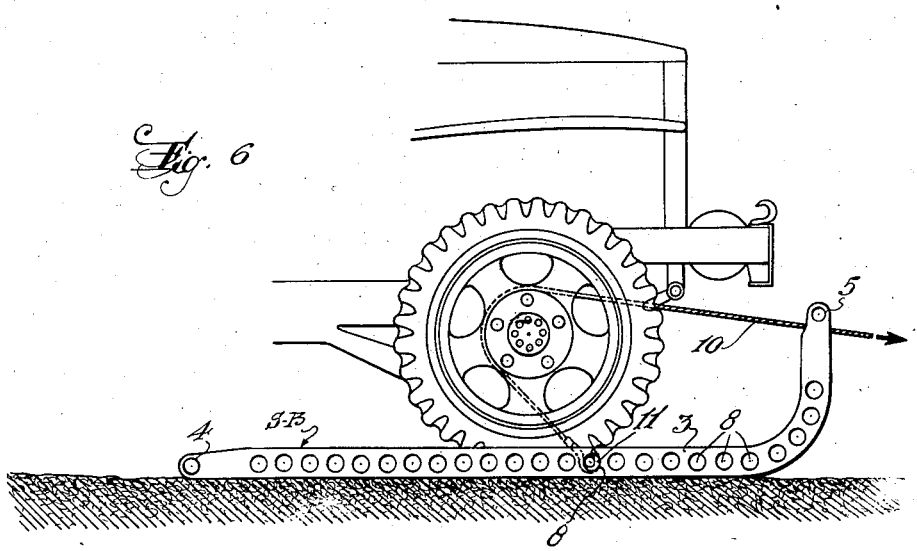
Figure 6 shows the truck wheel rolled onto the structure.

In the application of the S-B structure shown in Figures 1 to 4 inclusive, one form of use is illustrated in Figures 5 and 6. In these two figures a cable 10 is passed through the hole 7 and around the pipe 5 which may be reenforced by a rod as heretofore explained. The cable 10 is passed between the two dual wheels and over the union therebetween and then brought back to and over a rod which is inserted through some pair of the holes 8 in the side members 2 and 3. The pair of holes selected for the application of the end 11 will depend on the circumstances or conditions surrounding the use of the S-B structure. In some cases it may be necessary to hook the end 11 into a rod positioned in a pair of holes close to the end of the S-B structure which is inserted under the pair of wheels to be operated on. Then, after an initial start is made, the end 11 is then moved forward to some other holes so that the final position is something as shown in Figure 6. Power of any available kind may be applied to the cable 10 to pull the truck rearwardly onto the S-B structure.

Figure 7:
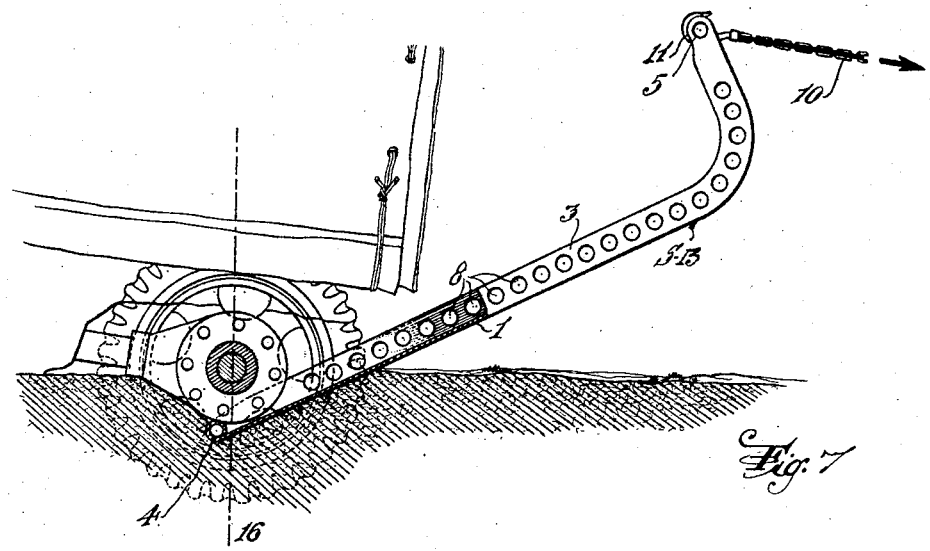
Figure 7 shows a truck dropped down into a cavity or mud and with the structure about to be applied between the rear wheels under the transmission to act as a pry-bar to lift the rear end of the truck sufficiently so one of the structures may be inserted under either one or both of the wheels.

If both sides of the truck or both sets of wheels are in the mud, it follows of course that a pair of these skids may be used or, as shown in Figure 7, one of the skids may be inserted under the transmission and used as a pry to pry up the truck so as to get a skid under either one or both sets of wheels, it being understood that a certain amount of dirt is dug away sufficiently around the transmission so that the S-B structure may be pushed thereunder about as indicated in Figure 7, so that the pipe 4 is beyond the vertical plane through the axle as indicated by the dotted line 16, so that when a pull is applied on the cable 10, the action of the pipe 4 is such as to produce a component force in the same direction as the pull on the cable 10.

Figure 8:
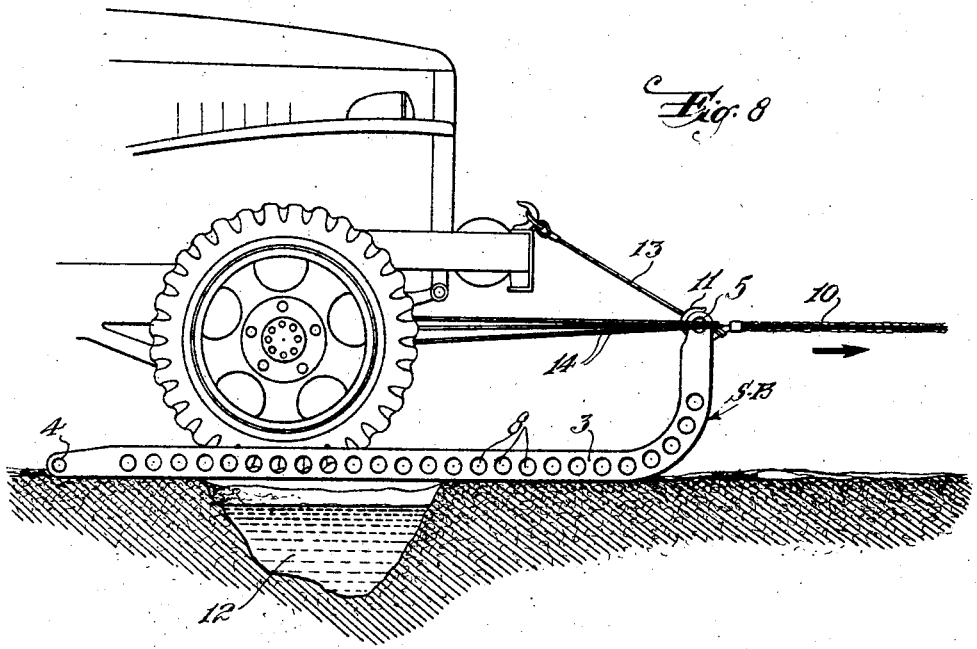
Figure 8 shows the structure used for bridging a ditch or cavity for getting the truck over the same.

In Figure 8 the S-B structure is shown as bridging a ditch or cavity 12 which is initially bridged by the S-B structure and the truck is run onto a pair of the devices, after which the truck is anchored by the cables 13 and 14 to the S-B structure and then power is applied to the chain or cable 10 to pull the forward part of the truck over the ditch, after which the rear part may be handled in a somewhat similar manner.

Figure 9:
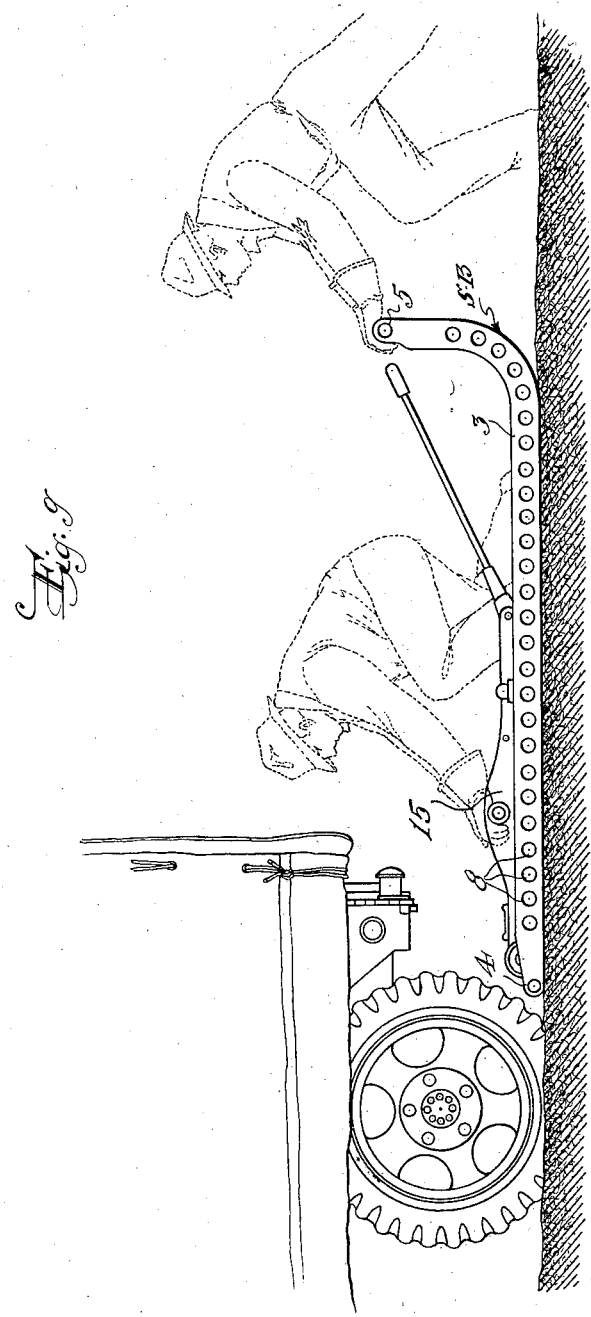
Figure 9 shows the structure used for supporting a jack on soft ground so that the jack may be used to lift the rear end of the truck.

In Figure 9 the S-B structure is shown carrying a heavy jack 15 of any suitable type such as used in and around heavy army trucks. In this case the S-B structure is pushed back under the truck so that the truck may be jacked up by engagement of some part of the chassis of the truck to lift the wheel out of the mud, after which the truck is anchored to the S-B structure somewhat as shown in Figure 8 and the whole pulled out as a unit in the same manner as in Figure 8.

Figure 10:
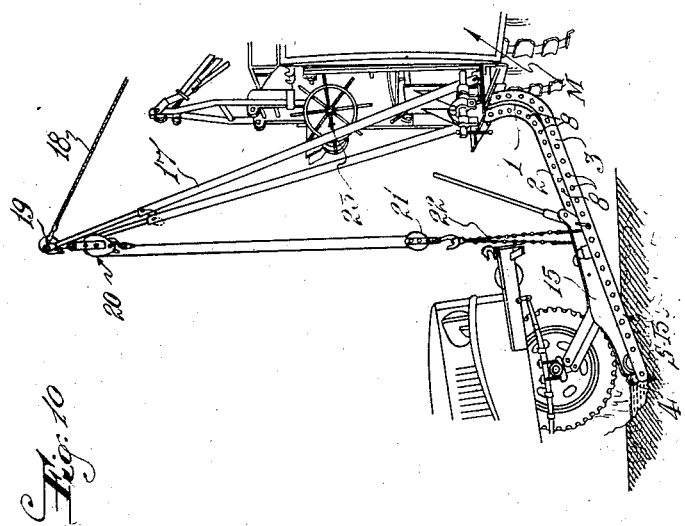
Figure 10 shows a further adaptation which is a modification of Figure 9.

In Figure 10 the S-B structure has the curved end pivotally anchored to the rear end of a machine shop M similar to that shown in my Design Patent D-109,942 heretofore referred to. A derrick has members 17 anchored at one end to M as indicated, with their free end fastened by a cable 18 to the forward upward portion 19 of M. The free end of the derrick members 17 supports a tackle 20, to the lower block 21 of which is attached a chain or cable 22 which may be fastened to any one of the holes 8 in the S-B structure in order to help support it in the mire or soft ground as it is pushed back by M, or pressure is applied thereto through the medium of the jack 15. The tackle is operated through a winch 23 or other satisfactory means carried by M.

In Figure 11 the S-B structure is used as a boom, having its straight end pivotally mounted to support members 24 carried by the rear end of M. To the free end of the S-B structure is attached a tackle 20, the lower block 21 of which carries a chain or cable 22 for attachment to any structure to be raised, the derrick members 17 being attached to the boom near the free end. A winch 23 is used for the same purpose as in Figure 10.

In Figure 12 the S-B structure is used as a boom, the same as in Figure 11, but in this case the derrick members 17, which are extensible, are fastened to outboard supports 25 which may be placed on the ground or some solid support. In both Figures 11 and 12 the boom is further supported by the cable hoist 18 passing over a ratchet type hoist 27 for positioning the S-B structure.

In Figure 13 the boom is attached to M as in Figure 10, but the free end is provided with a platform or carrier 26 for carrying materials that are to be moved by M.

From what has been said it will be seen that I have provided a structure suitable for various purposes, only several of which have been shown and described to illustrate the great utility of the device.

What I claim is:

1. A combination scoop-boom structure comprising a stiff metal plate having relatively stiff side members, said side members having a plurality of holes extending along their length, the plate and side members being curved upwardly at one end thereof to a point materially above the upper edges of the main portion of the structure and the angle of curvature being approximately ninety degrees, a cross-member at each end of the structure, and means for permitting attachment to each cross-member as required.

2. A combination scoop-boom structure comprising a stiff metal plate having relatively stiff side members, said side members having a plurality of holes extending along their length, the plate and side members being curved upwardly at one end thereof to a point materially above the upper edges of the main portion of the structure and the angle of curvature being approximately ninety degrees, a hollow cross-member fastened to the side members at each end of the structure for receiving a reenforcing strain-bar, and holes at each end of the plate for facilitating making a strain engagement with either of said cross-members.

3. A combination scoop-boom structure comprising a stiff metal plate having relatively stiff side members, said side members having a plurality of holes extending along their length, the plate also having relatively narrow strips fastened to its bottom on opposite edges adjacent said side members, the plate, strips and side members being curved upwardly at one end thereof to a point materially above the upper edges of the main portion of the structure and the angle of curvature being approximately ninety degrees, a cross-member at each end of the structure, and means for making attachment to said cross-members as required approximately on the median line of the plate.

4. A combined scoop-and-boom structure comprising a stiff metal plate with relatively stiff side members having a plurality of holes extending along their length, the plate also having relatively narrow strips fastened to its bottom on opposite edges adjacent said side members, the plate with said strips and side members being curved upwardly at one end thereof to a point materially above the upper edges of the main portion of the structure and the angle of curvature being approximately ninety degrees, a cross-member at each end of the structure, and means for making attachment to said cross-members as required approximately on the median line of the plate, said strips having spaced holes longitudinally of their length on at least the straight portion of the plate.

5. A combined scoop-and-boom structure comprising a stiff metal plate with relatively stiff side members having a plurality of holes extending along their length, the plate also having relatively narrow strips fastened to its bottom on opposite edges adjacent said side members, the plate with said strips and side members being curved upwardly a distance materially above the main portion of the structure, the angle of curvature being approximately ninety degrees, a cross-member at each end of the structure, and means for making attachment to said cross-members as required, approximately on the median line of the plate, said strips having spaced holes longitudinally of their length on at least the straight portion of the plate.

6. A combined scoop-and-boom structure capable of use as a scoop or a boom comprising a stiff metal plate having stiff side members, the plate and side members being curved upwardly at one end to a point materially above the upper edges of the main portion of the structure and the angle of curvature being approximately ninety degrees, means for permitting strain attachments at least at the upwardly curved end, and further means for permitting strain attachments at the other end and at points intermediate the ends of the plate.

7. The combination of an automotive vehicle and a scoop-boom structure, the vehicle carrying scoop-boom support members at the top and bottom of the rear end of the vehicle, means on the roof of the vehicle for positioning the scoop-boom structure, and means between said support members for cooperation with the scoop-boom structure for the operation of a tackle to be fastened to the scoop-boom structure, said structure comprising a stiff metal plate having reinforcing side members with spaced holes therein for permitting attachment to the boom, the plate and side members having one end formed at a substantial angle with the plane of the plate, with means for permitting attachment to this formed end which, when attached to said bottom support member, allows the scoop-boom structure to be used as a scoop or boom as herein defined, but when the straight end of the scoop-boom structure is attached to the top support members with the formed end turned downwardly, the structure may be used as a boom in the manner described.

KIBBEY W. COUSE.